United States Patent
Zhan et al.

(10) Patent No.: US 11,004,148 B2
(45) Date of Patent: *May 11, 2021

(54) COUPON BLENDING OF A SWAP PORTFOLIO

(71) Applicant: Chicago Mercantile Exchange Inc., Chicago, IL (US)

(72) Inventors: Wansu Zhan, Chicago, IL (US); Dhiraj Bawadhankar, Aurora, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/394,529

(22) Filed: Apr. 25, 2019

(65) Prior Publication Data

US 2019/0251634 A1   Aug. 15, 2019

Related U.S. Application Data

(63) Continuation of application No. 14/338,080, filed on Jul. 22, 2014, now Pat. No. 10,319,032.

(60) Provisional application No. 61/991,188, filed on May 9, 2014.

(51) Int. Cl.
    *G06Q 40/04*   (2012.01)
(52) U.S. Cl.
    CPC .................................. *G06Q 40/04* (2013.01)
(58) Field of Classification Search
    CPC ...................................................... G06Q 40/04
    USPC ..................................................... 705/35–45
    See application file for complete search history.

(56) References Cited

U.S. PATENT DOCUMENTS

| | | |
|---|---|---|
| 5,068,816 A | 11/1991 | Noetzel |
| 5,274,813 A | 12/1993 | Itoh |
| 5,978,511 A | 11/1999 | Horiuchi |
| 6,064,985 A | 5/2000 | Anderson |
| 6,278,981 B1 | 8/2001 | Dembo et al. |
| 6,282,520 B1 | 8/2001 | Schirripa |
| 6,304,858 B1 | 10/2001 | Mosler |
| 6,317,727 B1 | 11/2001 | May |
| 6,333,788 B1 | 12/2001 | Yamada |
| 6,385,249 B1 | 5/2002 | Kondo |
| 6,424,972 B1 | 7/2002 | Berger |

(Continued)

FOREIGN PATENT DOCUMENTS

WO     WO0150776 A3     5/2002

OTHER PUBLICATIONS

Extended European Search Report in European Patent Application No. 15174114.7, dated Nov. 4, 2015, 6 pages.

(Continued)

*Primary Examiner* — Robert R Niquette
(74) *Attorney, Agent, or Firm* — Lempia Summerfield Katz LLC

(57) ABSTRACT

Systems and methods for blending a plurality of swaps may include determining a fixed rate for use in blending a plurality of swaps, each of the plurality of swaps having matching economics and a different associated fixed rate. A computing device may determine a first remnant swap and a second remnant swap to blend the plurality of swaps using the determined fixed rates. This may reduce the gross notional and/or the total clearing line items associated with the original swaps. In some cases, the computing device may determine one single swap for blending the plurality of swaps.

22 Claims, 7 Drawing Sheets

(56) References Cited

U.S. PATENT DOCUMENTS

| | | |
|---|---|---|
| 7,222,317 B1 | 5/2007 | Mathur |
| 7,236,952 B1 | 6/2007 | D, Zmura |
| 7,349,878 B1 | 3/2008 | Makivic |
| 7,430,539 B2 | 9/2008 | Glinberg |
| 7,509,275 B2 | 3/2009 | Glinberg |
| 7,580,876 B1 | 8/2009 | Phillips |
| 7,587,641 B1 | 9/2009 | Sloane |
| 7,734,538 B2 | 6/2010 | Bauerschmidt |
| 7,822,668 B1 | 10/2010 | Benda |
| 7,870,052 B1 | 1/2011 | Goldberg |
| 8,108,281 B2 | 1/2012 | Koblas |
| 8,165,942 B1 | 4/2012 | Rordorf |
| 8,301,537 B1 | 10/2012 | Rachev |
| 8,515,058 B1 | 8/2013 | Gentry |
| 8,805,735 B1 | 8/2014 | Goldberg |
| 8,862,560 B1 | 10/2014 | Wu |
| 8,965,804 B2 * | 2/2015 | Connors ............... G06Q 40/00 705/37 |
| 9,396,131 B1 | 7/2016 | Hendry |
| 2002/0002528 A1 | 1/2002 | Terada |
| 2002/0038272 A1 | 3/2002 | Menchero |
| 2002/0138386 A1 | 9/2002 | Maggioncalda |
| 2003/0036918 A1 | 2/2003 | Pintsov |
| 2003/0055777 A1 | 3/2003 | Ginsberg |
| 2003/0061577 A1 | 3/2003 | Saluja |
| 2003/0101026 A1 | 5/2003 | Rabinowitz |
| 2003/0204462 A1 * | 10/2003 | Eisler ............... G06Q 40/02 705/36 R |
| 2003/0236738 A1 | 12/2003 | Lange |
| 2004/0177023 A1 | 9/2004 | Krowas |
| 2004/0186804 A1 | 9/2004 | Chakraborty |
| 2004/0199448 A1 | 10/2004 | Chalermkraivuth |
| 2004/0205457 A1 | 10/2004 | Bent |
| 2004/0220870 A1 | 11/2004 | Lundberg |
| 2005/0050372 A1 | 3/2005 | Hagiwara |
| 2005/0055301 A1 | 3/2005 | Cohen |
| 2005/0096950 A1 | 5/2005 | Caplan |
| 2006/0059067 A1 | 3/2006 | Glinberg |
| 2006/0112049 A1 | 5/2006 | Mehrotra |
| 2006/0224494 A1 | 10/2006 | Pinkava |
| 2006/0259378 A1 | 11/2006 | Fornasari |
| 2007/0033123 A1 | 2/2007 | Navin |
| 2007/0083586 A1 | 4/2007 | Luo |
| 2007/0156555 A1 | 7/2007 | Orr |
| 2007/0186206 A1 | 8/2007 | Abrams |
| 2007/0198387 A1 | 8/2007 | Uenohara |
| 2007/0244785 A1 | 10/2007 | Williams |
| 2007/0271204 A1 | 11/2007 | Jiang |
| 2007/0288351 A1 | 12/2007 | Huntley |
| 2008/0120251 A1 | 5/2008 | Tyagi |
| 2008/0183615 A1 | 7/2008 | Rio |
| 2008/0196076 A1 | 8/2008 | Shatz |
| 2008/0235172 A1 | 9/2008 | Rosenstein |
| 2008/0249956 A1 | 10/2008 | Connors |
| 2008/0249958 A1 | 10/2008 | Anguish |
| 2008/0294571 A1 | 11/2008 | Maloney |
| 2008/0319920 A1 | 12/2008 | Levin |
| 2009/0138536 A1 | 5/2009 | Chao |
| 2009/0171826 A1 | 7/2009 | Hadi |
| 2009/0216824 A1 | 8/2009 | Weinberg |
| 2009/0248564 A1 | 10/2009 | Fallon |
| 2009/0265284 A1 | 10/2009 | Rowell |
| 2009/0281956 A1 | 11/2009 | An |
| 2009/0299910 A1 | 12/2009 | Khuong-huu |
| 2009/0307124 A1 | 12/2009 | Meyerhoff, Ii |
| 2009/0327160 A1 * | 12/2009 | Perry ............... G06Q 40/04 705/36 R |
| 2010/0106633 A1 | 4/2010 | Iyer |
| 2010/0138362 A1 | 6/2010 | Whitehurst |
| 2010/0145875 A1 | 6/2010 | Schmid |
| 2010/0191628 A1 | 7/2010 | Arnott |
| 2010/0259204 A1 | 10/2010 | Imura |
| 2010/0280970 A1 | 11/2010 | Lai |
| 2010/0281086 A1 | 11/2010 | Ganai |
| 2010/0323350 A1 | 12/2010 | Gordon |
| 2010/0328530 A1 | 12/2010 | Hashimoto |
| 2011/0004568 A1 | 1/2011 | Phillips |
| 2011/0035342 A1 | 2/2011 | Koblas |
| 2011/0060603 A1 | 3/2011 | Capelli |
| 2011/0153521 A1 | 6/2011 | Green |
| 2011/0161244 A1 | 6/2011 | Iyer |
| 2011/0221489 A1 | 9/2011 | Tarng |
| 2012/0296793 A1 | 11/2012 | Wilson, Jr. |
| 2013/0018769 A1 | 1/2013 | Boudreault |
| 2013/0018818 A1 | 1/2013 | Yadav |
| 2013/0036074 A1 | 2/2013 | Kaestel |
| 2013/0041799 A1 | 2/2013 | Nyhoff |
| 2013/0041843 A1 | 2/2013 | Nyhoff |
| 2013/0117197 A1 | 5/2013 | Shah |
| 2013/0241933 A1 | 9/2013 | Thatcher |
| 2013/0282554 A1 | 10/2013 | Boberski |
| 2013/0339272 A1 | 12/2013 | Willism, Iii |
| 2014/0023167 A1 | 1/2014 | Meyer |
| 2014/0025552 A1 * | 1/2014 | Hirani ............... G06Q 40/04 705/37 |
| 2014/0258072 A1 | 9/2014 | Mayor |
| 2015/0026028 A1 * | 1/2015 | Davies ............... G06Q 40/04 705/37 |
| 2015/0063374 A1 | 3/2015 | Venkatachalam Jayaraman |
| 2015/0324914 A1 | 11/2015 | Zhan et al. |
| 2015/0365619 A1 | 12/2015 | Mayer |
| 2016/0246266 A1 | 8/2016 | Kniazev |
| 2016/0285571 A1 | 9/2016 | Badiu |
| 2017/0061329 A1 | 3/2017 | Kobayashi |

OTHER PUBLICATIONS

Extended European Search Report in European Patent Application No. 15191983.4, dated Dec. 17, 2015, 6 pages.
ICAP, TriOptima and LCH.Cieamet Compression of Cleared Interest Rate Swaps Exceeds $100 trillion in Notional; $20.4 trillion Compressed in 2012 Alone, http://www.icap.com/news/2012/trioptima-swap-clear-usd100-trillion.aspx, 2 pages, Feb. 23, 2012.
International Search Report in International Patent Application No. PCT/US2015/029941, dated May 9, 2014, 2 pages.
ISDA, Interest Rate Swaps Compression: A Progress Report, ISDA Study, 9 pages, Feb. 2012.
Labuszewski et al., CME Group, Speculative Strategies with Treasury Options, © CME Group, 36 pages, Nov. 11, 2013.
Office Action in European Patent Application No. 15174114.7, dated Jun. 13, 2018, 7 pages.
Orcun Kaya, Deutsche Bank, Reforming OTC derivatives markets Observable changes and open issues, © 2013 Deutsche Bank AG, DB Research, 24 pages, Aug. 7, 2013.
Risk Management—Portfolio Compression for Outstanding Interest Rate Swap Trades. https:l/www.ccilindia.com/RiskManagement/Pages/Portfoliocompression.aspx. © 2014, Developed by NSE-IT and Maintained by CCI L-IT, 1 page, May 6, 2014.

* cited by examiner

COUPON BLENDING OF A SWAP PORTFOLIO

REFERENCE TO RELATED APPLICATIONS

This application is a continuation under 37 C.F.R. § 1.53(b) of U.S. patent application Ser. No. 14/338,080 filed Jul. 22, 2014 now U.S. Pat. No. 10,319,032, which claims the benefit of the filing date under 35 U.S.C. § 119(e) U.S. Provisional Patent Application Ser. No. 61/991,188, filed May 9, 2014, the entire disclosures of which is hereby incorporated by reference.

BACKGROUND

Over-the-counter (OTC) products include financial instruments that are bought, sold, traded, exchanged, and/or swapped between counterparties. Many OTC derivatives exist to fill a wide range of needs for counterparties, including limiting or mitigating exposure to risks and/or maximizing cash flow. After an exchange of an OTC product, counterparties may expend resources managing the product for the duration of its life. Management may be complicated based on the number of exchanges and/or the specific terms of the contract.

An interest rate swap (IRS) is an example of a type of OTC product where the parties agree to exchange streams of future interest payments based on a specified principal or notional amount. Each stream may be referred to as a leg. Swaps are often used to hedge certain risks, for instance, interest rate risk. They can also be used for speculative purposes.

An example of a swap includes a plain fixed-to-floating, or "vanilla," interest rate swap. The vanilla swap includes an exchange of interest streams where one stream is based on a floating rate and the other interest stream is based on a fixed rate. In a vanilla swap, one party makes periodic interest payments to the other based on a fixed interest rate. In return for the stream of payments based on the fixed rate, the party may receive periodic interest payments based on a variable rate. The payments are calculated over the notional amount.

The variable rate may be linked to a periodically known or agreed upon rate for the term of the swap such as the London Interbank Offered Rate (LIBOR). This rate is called variable, because it is reset at the beginning of each interest calculation period to the then current reference rate, such as LIBOR published rate. The parties to an IRS swap generally utilize these exchanges to limit, or manage, exposure to fluctuations in interest rates, or to obtain lower interest rates than would otherwise be unobtainable.

Usually, at least one of the legs to a swap has a variable rate. The variable rate may be based on any agreed upon factors such as a reference rate, the total return of a swap, an economic statistic, etc. Other examples of swaps include total return swaps, and Equity Swaps.

The expiration or maturity of the future streams of payments may occur well into the future. Each party may have a book of existing and new IRSs having a variety of maturity dates. The parties may expend substantial resources tracking and managing their book of IRSs and other OTC products. In addition, for each IRS, the party maintains an element of risk that one of its counterparties will default on a payment.

Currently, financial institutions such as banks trade interest rate payments and/or interest rate swaps over the counter. Steams of future payments must be valued to determine a current market price. The market value of a swap is the sum of the difference between the present value of the future fixed cash flows and the floating rate and the price of the swap is determined based on the fixed rate. Because the fixed rate of a particular swap is determined based on the available fixed rate at the time the price is struck, the fixed rates associated with two different swaps will rarely be the same. As such, each swap that is struck causes a separate line item to be booked until an opposite swap with the same fixed rate is struck. As such, it would be desirable to provide a way to blend coupons for reducing notional amounts and/or line items (e.g., swaps) on a financial organization's books.

SUMMARY OF THE INVENTION

Systems and methods are described for reducing notional amount and/or clearing line items associated with swaps that are on an organization's books. In some cases, a method for reducing a notional amount and/or clearing line items associated with a portfolio of swaps may include determining at least a first fixed rate for use in blending a plurality of swaps. Each of the swaps may have matching economics and a different associated fixed rate. The method may further include determining, by one or more computing devices, a first remnant swap using the first fixed rate and determining a second remnant swap using a second fixed rate, wherein the second fixed rate is different than the first fixed rate.

In some cases, a non-transitory computer-readable medium may contain computer-executable instructions, that when executed by a processor, cause one or more computing devices to determine a first blend rate for use in blending a plurality of swaps. Each of the plurality of swaps may have matching economics and a different associated fixed rate. The instructions may further cause the one or more computing devices to determine a first remnant swap using the first blend rate and to determine a second remnant swap using the second blend rate to blend the plurality of swaps.

In some cases, a system for reducing notional amount and/or clearing line items associated with swaps that are on an organization's books may include a network and one or more computing devices. The computing devices may include a processor and one or more non-transitory memory devices storing instructions that, when executed by the processor, cause the one or more computing devices to determine a first blend rate and a second blend rate for use in blending a plurality of swaps. Each of the plurality of swaps may have matching economics and a different associated fixed rate. The instructions may further cause the one or more computing devices to determine a first remnant swap using the first blend rate and determine a second remnant swap using the second blend rate to blend the plurality of swaps together with first remnant swap. The one or more computing devices may then communicate, via the network, information corresponding to the first remnant swap and the second remnant swap to an institution associated with the plurality of swaps.

In some cases, a method for compressing a portfolio of swaps may be implemented by a computer device and include determining a fixed rate for use in blending a plurality of swaps, where each of the plurality of swaps may have matching economics and a different associated fixed rate. A computing device may further determine a blended swap for blending the plurality of swaps using the fixed rate, wherein a gross notional of the blended swap could be less than the gross notional amount for the plurality of swaps and/or reducing the number of clearing line items.

The details of these and other embodiments of the present invention are set forth in the accompanying drawings and the description below. Other features and advantages of the invention will be apparent from the description and drawings.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION OF THE DRAWINGS AND PRESENTLY PREFERRED EMBODIMENTS

Figure 1:
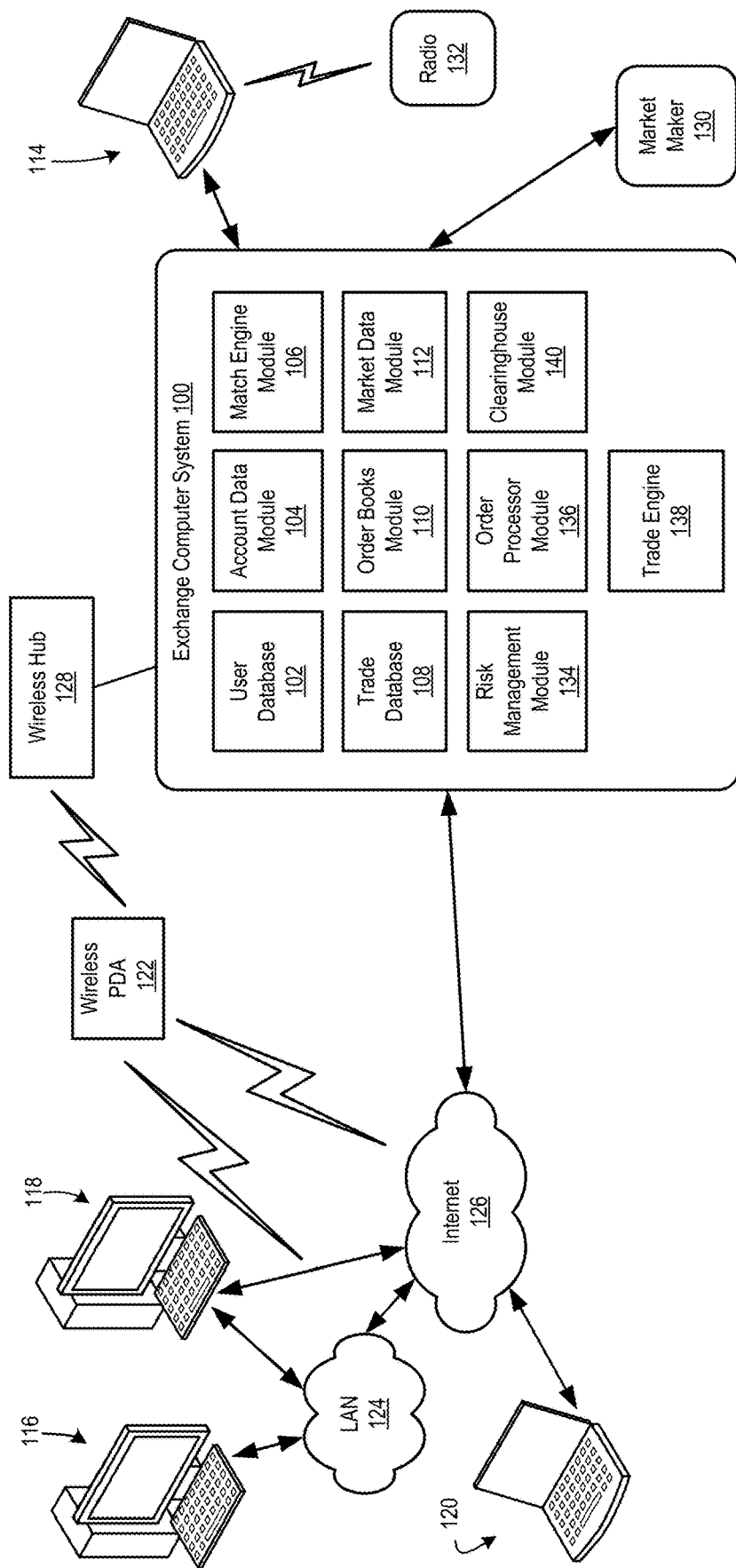
FIG. 1 shows an illustrative trading network environment for implementing trading systems and methods according to at least some embodiments.

In some cases, clients may desire to enter into one or more swaps (e.g., interest rate swaps) for hedging a position in a market. For example, an organization may have multiple positions in fixed rate mortgages, while having less exposure to products associated with a floating rate. At such times, the organization may desire to enter into one or more swaps with another party to hedge risks that may be associated with having a majority of fixed rate products. For example, when interest rates fall, the organization may make money by having a majority of fixed rate products in a portfolio. However, when the market goes up (e.g., interest rates rise), the organization may lose the opportunity to profit from the higher interest rates. By hedging these risks, the parties to the interest rate swaps may have a goal to allow their assets and/or liabilities to at least remain near the starting levels and/or minimize any losses. Generally, an available fixed rate dictates the price of a swap, where the fixed rate available at the market changes over time. For example, a dealer may quote a swap at a first rate at a time 0. A short time later (e.g., about 10 minutes, about 30 minutes, etc.), the same dealer may provide a quote for a similar swap, but having a second rate that is different than the first rate. Once the swaps are entered, the fixed rate will remain fixed for the lifetime of the swap. Over time, a swap purchaser (e.g., an individual, an organization, a business, etc.) may develop a portfolio of swaps, including the swaps of at least one payer swap (e.g., providing the fixed rate leg of the swap) and/or at least one receiver swap (e.g., providing the floating rate leg of the swap). Few, if any, swaps may have the same interest rate resulting in a large number of swaps to remain open on the organization's books.

An organization or an individual may enter into multiple swaps during a given time frame (e.g., a day, a week, a month, etc.) and, as a result, may have multiple line items in their books in relation to these swaps. For example, a customer may have a first swap for paying a set amount (e.g., $100 million) and a second swap for receiving the same set amount (e.g., $100 million). Although these swaps are associated with the same notional amount, the interest rates are likely to be different. As such, these swaps will not net out. Rather, the $200 million remains open on the organization's books. These swaps may further be subject to regulatory requirements, such as governmental requirements, international banking requirements (e.g., BASEL 3 requirements), and/or the like. These regulatory requirements may, in turn, subject the organization to capital charges (e.g., a specified cash reserve) to ensure that a financial organization has enough cash to cover their liabilities regarding their swap portfolio.

In an illustrative example, a financial institution may have a house account having a number of swaps open in the account. Under the regulatory requirements, the financial institution is required to set aside capital (e.g., a margin account) to cover the open swaps. This cash requirement may be dependent upon, at least in part, on the gross notional amount and/or the total clearing line items associated with the swap portfolio. As such, the financial organization can reduce its capital requirements by reducing the number of line items on their books, and/or by reducing the gross notional of the swap portfolio.

In some cases, multiple line items having the same interest rate may be collapsed together (e.g., canceled). For example, a pay swap having an associated first notional amount of may be offset by a second notional amount associated with a receive swap when the pay and receive swaps have the same interest rate. However this is rare. For example, a swap participant may use an investment strategy for achieving the same fixed rate for two or more different swaps. In such cases, the customer may specify a desired rate for a swap when contacting a dealer. While the dealer may be able to find a counter-party willing enter into a swap at that rate, the swap may incur a fee to equalize the economics of the swap. For example, at the desired fixed rate, the economics of the swap may favor the paying party or the receiving party. By equalizing these differences, the swap may then be structured to allow the total value of the fixed rate leg to be equal to the floating rate leg of the swap. In general, when the interest rates are determined for the swaps, the precision may be specified by one or more parties to the swap. In some cases, the precision of the rates may be limited to a defined precision common to the market, such as about 2 decimal places, about 5 decimal places, up to 7 decimal places. In other cases, the rate precision may be specified to be a precision greater than 7 decimal places, such as 11 decimal places, up to 16 decimal places, etc.)

In some cases, a clearing house may monitor a portfolio of swaps to determine whether any of the total notional value of the swap portfolio may be canceled or otherwise offset. For example, the clearing house may, on a periodic (e.g., daily) basis, process an algorithm to determine a net value of a client's swap portfolio and send a message to the client to terminate a line item, or offset at least a portion of the gross notional value when two or more line items may be collapsed.

In the past, the over-the-counter swap market was largely a bespoke market, where a customer desiring to enter into a swap would contact, such as by telephone, one or more dealers to determine which dealer would offer the best price to enter into the deal. In such cases, the swap may be entered on a common platform, but the trade execution was completed by phone. Because swaps may not be fully transparent, governmental regulations have required that swaps be executed via a Swap Execution Facility (SEF). A SEF is a regulated platform for swap trading that provides pre-trade information, such as bids, offers, and the like, and/or an execution mechanism to facilitate execution of swap transactions among eligible participants. Over time more and more types of swaps may be executed via a SEF, such as interest rate swaps. Because the SEF may operate using a more automated swap market mechanism, the likelihood that a customer may enter into different swaps, where each share a same interest rate will become increasingly rare. A SEF may execute many swaps with multiple coupons at a centralized location. In some cases, different swaps may share the same, or similar, economics to another swap. However, the coupons are likely to differ due to the swaps executing at different times. As such a client may quickly build a book (e.g., swap portfolio) with many swap line items, which, in turn, would require the client to incur a large capital obligation corresponding to the gross notional and/or the total clearing line items of the book of swaps.

Exemplary Operating Environment

Aspects of at least some embodiments can be implemented with computer systems and computer networks that allow users to communicate trading information. An exemplary trading network environment for implementing trading systems and methods according to at least some embodiments is shown in FIG. 1. The implemented trading systems and methods can include systems and methods, such as are described herein, that facilitate trading and other activities associated with financial products based on currency pairs.

Computer system 100 can be operated by a financial product exchange and configured to perform operations of the exchange for, e.g., trading and otherwise processing various financial products. Financial products of the exchange may include, without limitation, futures contracts, options on futures contracts ("futures contract options"), and other types of derivative contracts. Financial products traded or otherwise processed by the exchange may also include over-the-counter (OTC) products such as OTC forwards, OTC options, etc.

Computer system 100 receives orders for financial products, matches orders to execute trades, transmits market data related to orders and trades to users, and performs other operations associated with a financial product exchange. Exchange computer system 100 may be implemented with one or more mainframe, desktop or other computers. In one embodiment, a computer device uses one or more 64-bit processors. A user database 102 includes information identifying traders and other users of exchange computer system 100. Data may include user names and passwords. An account data module 104 may process account information that may be used during trades. A match engine module 106 is included to match prices and other parameters of bid and offer orders. Match engine module 106 may be implemented with software that executes one or more algorithms for matching bids and offers.

A trade database 108 may be included to store information identifying trades and descriptions of trades. In particular, a trade database may store information identifying the time that a trade took place and the contract price. An order book module 110 may be included to store prices and other data for bid and offer orders, and/or to compute (or otherwise determine) current bid and offer prices. A market data module 112 may be included to collect market data, e.g., data regarding current bids and offers for futures contracts, futures contract options and other derivative products. Module 112 may also prepare the collected market data for transmission to users. A risk management module 134 may be included to compute and determine a user's risk utilization in relation to the user's defined risk thresholds. An order processor module 136 may be included to decompose delta based and bulk order types for further processing by order book module 110 and match engine module 106.

A clearinghouse module 140 may be included as part of exchange computer system 100 and configured to carry out clearinghouse operations. Module 140 may receive data from and/or transmit data to trade database 108 and/or other modules of computer system 100 regarding trades of futures contracts, futures contracts options, OTC options and contracts, and other financial products. Clearinghouse module 140 may facilitate the financial product exchange acting as one of the parties to every traded contract or other product. For example, computer system 100 may match an offer by party A to sell a financial product with a bid by party B to purchase a like financial product. Module 140 may then create a financial product between party A and the exchange and an offsetting second financial product between the exchange and party B. As another example, module 140 may maintain margin data with regard to clearing members and/or trading customers. As part of such margin-related operations, module 140 may store and maintain data regarding the values of various contracts and other instruments, determine mark-to-market and final settlement amounts, confirm receipt and/or payment of amounts due from margin accounts, confirm satisfaction of final settlement obligations (physical or cash), etc. As discussed in further detail below, module 140 may determine values for performance bonds associated with trading in products based on various types of currency pairs.

Each of modules 102 through 140 could be separate software components executing within a single computer, separate hardware components (e.g., dedicated hardware devices) in a single computer, separate computers in a networked computer system, or any combination thereof (e.g., different computers in a networked system may execute software modules corresponding more than one of modules 102-140).

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may implement one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics, radio links or other media.

A wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet. Computers 116, 118 and 120 may communicate with each other via the Internet 126 and/or LAN 124.

One or more market makers 130 may maintain a market by providing constant bid and offer prices for a derivative or security to exchange computer system 100. Exchange computer system 100 may also include trade engine 138. Trade engine 138 may, e.g., receive incoming communications from various channel partners and route those communications to one or more other modules of exchange computer system 100.

One skilled in the art will appreciate that numerous additional computers and systems may be coupled to exchange computer system 100. Such computers and systems may include, without limitation, additional clearing systems (e.g., computer systems of clearing member firms), regulatory systems and fee systems.

The operations of computer devices and systems shown in FIG. 1 may be controlled by computer-executable instructions stored on non-transitory computer-readable media. For example, computer device 116 may include computer-executable instructions for receiving market data from exchange computer system 100 and displaying that information to a user. As another example, clearinghouse module 140 and/or other modules of exchange computer system 100 may include computer-executable instructions for performing operations associated with determining performance bond contributions associated with holdings in products that are based on various types of currency pairs.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Exemplary Embodiments

In some cases, the clearinghouse module 140 may be configured to monitor and/or otherwise manage a capital obligation associated with a plurality of swaps, such as a swap portfolio. In at least some embodiments, the exchange computer system 100 (or "system 100") receives, stores, generates and/or otherwise and processes data. In accordance with various aspects of the invention, a clearinghouse (e.g., the clearinghouse module 140) may act as a guarantor of the agreement for the derivative. As discussed above, a derivative (e.g., an over the counter swap) may be cleared and guaranteed by the clearinghouse. This may promise more interesting capital efficiencies to allow institutions to reduce a capital charge associated with a plurality of swaps, such as by reducing a gross notional and/or reducing line items associated with the plurality of swaps.

Figure 2:
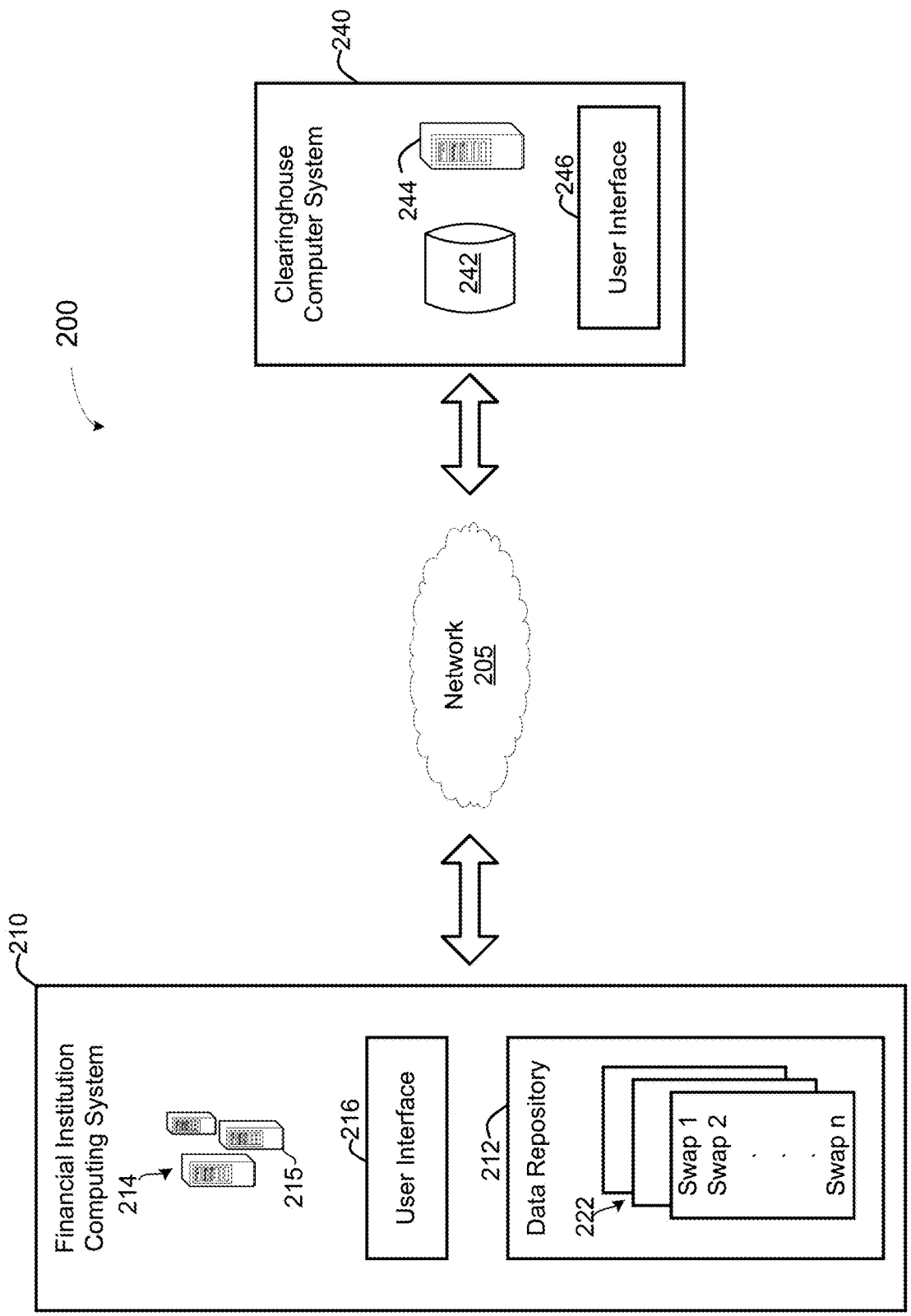
FIG. 2 shows a portion of an illustrative system for blending coupons associated with a plurality of swaps in accordance with an aspect of the invention.

FIG. 2 shows a portion of an illustrative system 200 for blending coupons associated with a plurality of swaps in accordance with an aspect of the invention. In some cases, the illustrative system 200 may include a financial institution computing system 210 communicatively coupled to a clearinghouse computer system 240 via a network 205 (e.g., a wide area network (WAN), the LAN 124, the Internet 126, etc.). The financial institution computing system 210 may include a data repository 212, one or more computing devices 214, and, in some cases, at least one user interface 216. In some cases, the data repository 212 may store information about one or more swap portfolios 222, where the swap portfolios may include information about two or more different swaps (e.g., swap 1, swap 2, swap n, etc.). For example, the swap information may include a fixed rate value, a floating rate value, a notional value, and/or a cash value for each of the plurality of different swaps of the swap portfolios 222. In some cases, the swap portfolios 222 may be associated with the financial institution, and/or one or more different customers of the financial institution. For example, a financial entity and/or a customer of the financial entity may desire to enter into one or more different swaps to hedge financial risk due to a plurality of fixed rate holdings and/or a plurality of floating rate holdings. In some cases, a computing device 215 and/or the user interface 216 may be used to facilitate user access to the one or more swap portfolios 222. For example, a user may log into the financial institution computing system 210 via one or more user interface screens accessible via the user interface 216. In some cases, the user interface 216 is at a geographical location local to the financial institution computer system 210 and/or at a geographical location of the user.

In some cases, the clearinghouse computer system 240 may include one or more of a data repository 242, a computer device 244 and/or a user interface 246. The clearinghouse computer system 240 may be communicatively coupled to at least one financial institution computer system, such as the financial institution computing system 210 via the network 205. In some cases, the clearinghouse computer system 240 may be configured to obtain information about one or more of the swap portfolios 222, process the information to blend coupons associated with the different swaps of the swap portfolios 222 and communicate information about the blended swaps to the financial institution computing system 210 to reduce one or more line items associated with the swap portfolios 222 and/or to reduce a gross notional value associated with the swap portfolios 222 to reduce a total capital charge incurred by the financial institution in relation to the swap portfolios 222.

Figure 3:
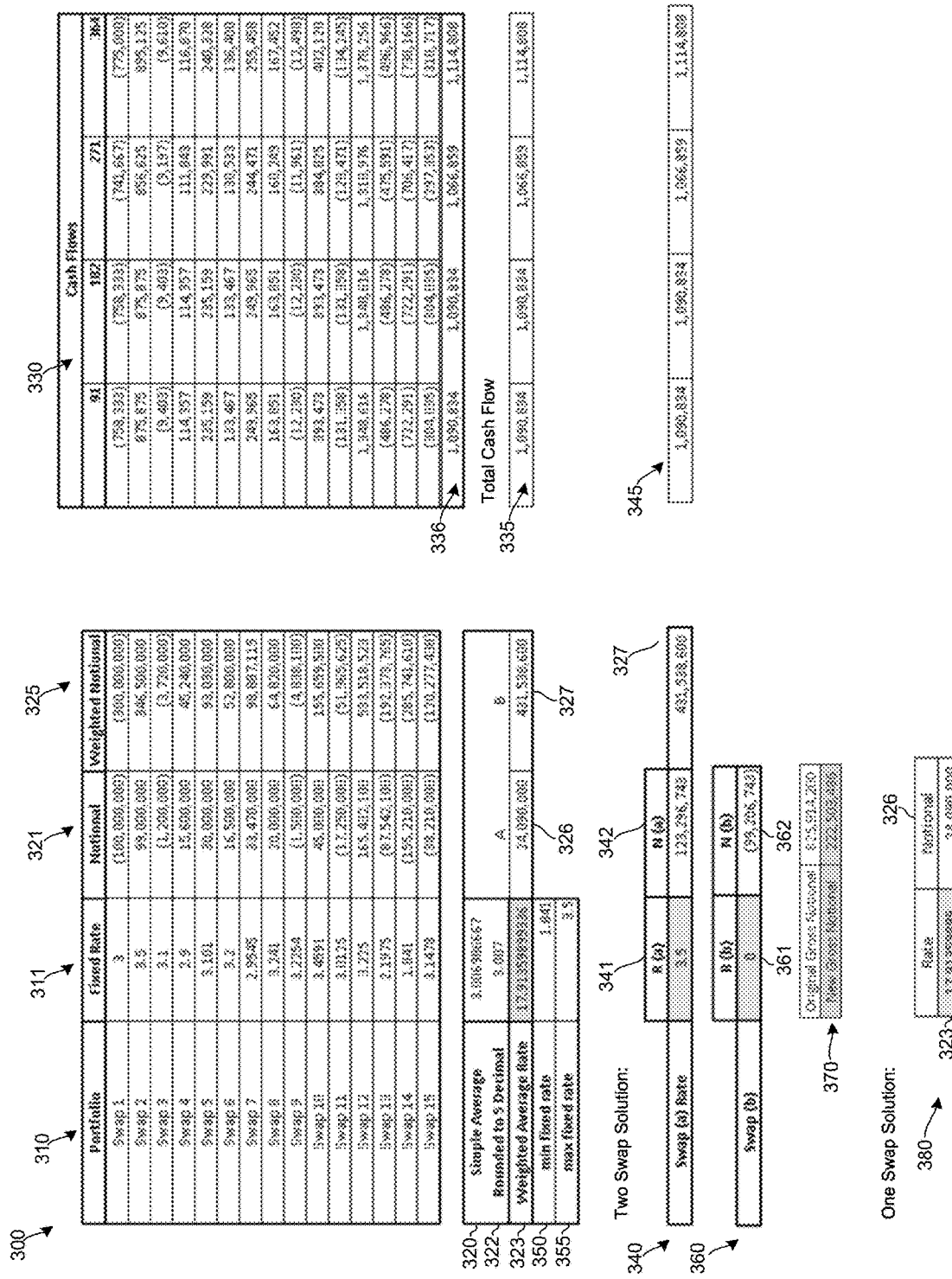
FIG. 3 illustrates a data table illustrative of a method for blending coupons of a swap portfolio in accordance with an aspect the invention.

FIG. 3 illustrates data tables 300, 340, 360, and 380 illustrative of a method for blending coupons of a swap portfolio by the clearinghouse computing system 240 in accordance with aspects the invention. The data table 300 includes information about a plurality of swaps 310 (e.g., the swap portfolios 222) held at the financial institution, a fixed rate 311, and a notional value 321 associated with each of the swaps 310. A weighted notional 325 may be calculated as a product of the fixed rate 311 and the notional value 321 for each of the swaps 310. The data table 300 may also include fixed coupon payments (e.g., cash flows 330) associated with each of the swaps 310, which may include one or more pay swaps and one or more receive swaps. The computing device 244 may be configured to compute an average rate 320 associated with the plurality of swaps 310. While the average may be calculated with high precision (e.g., greater than 5 decimal point precision), the market may only support a lesser degree of precision. As such the computing device 244 may round the average rate 320 to a rounded rate 322 having a precision common to the financial industry (e.g., about five decimal point precision).

In blending the coupons of the swap portfolio 222, the computing device 244 may then be configured to calculate a sum 326 of the notionals 321 and a sum 327 of the weighted notionals. A weighted average rate 323 may be calculated by dividing the sum 327 of the weighted notionals by the sum 326 of the notionals. In some cases, the weighted average rate 323 may have a high precision (e.g., greater than five decimal places, about eleven decimal places, etc.) such that the cash flows 335 associated with the remnant swap(s) are equal to the total cash flows 336 for the plurality of swaps 310 in the portfolio 222.

To properly blend the swaps 310, the cash flow of the blended swap(s) must be equal to the total cash flows 336 of the swaps 310. In many cases, the resulting precision required for the coupon matching is much greater than (e.g., greater than about five decimal places, about eleven decimal places, and the like) the precision commonly supported in the financial industry. As such, different methods may be used to blend the coupons, combine line items associated with swaps, and reduce a gross notional value associated with the plurality of swaps included in a swap portfolio 222.

In some cases, the coupons of the swaps 310 may be blended into two different swaps. In some cases, the first remnant swap may be determined as shown in table 340. In a first step, a rate may be determined (e.g., a maximum fixed rate 355 associated with the portfolio, a minimum fixed rate 350 associated with the portfolio, the rounded average rate of the swaps 310, a user selected rate, a current market rate, a past market rate, etc.)

for the first remnant swap and a second rate (e.g. a minimum fixed rate 350 associated with the portfolio, a maximum fixed rate 355 associated with the portfolio, a rounded average rate, a user selected rate, a current market rate, a past market rate, etc.) may be selected for the second remnant swap. For example, the second rate may be greater than or equal to 0, but less than the rate associated with the first remnant swap. The notional value of the first remnant swap may be determined using the sum the notionals of the plurality of swaps, a sum of weighted notionals of the plurality of swaps, the rate associated with the first remnant swap and the rate associated with the second remnant swap. Further, the notional of the second remnant swap may be determined based on the notional of the first remnant swap and the sum of the notional values of the portfolio of swaps 310. To properly blend the swaps 310, the cash flows 345 of the first and second remnant swaps must match the total cash flows associated with the swaps 310.

In an illustrative example, the notional value 362 of the second remnant swap may be computed by subtracting the notional 342 of the first remnant swap from the total net notional, such as the sum 326 of the notional amounts of the swaps 310. The rate 361 of the second remnant swap may be set to zero, or another desired value. When the rate of the second remnant swap is set to zero, the first remnant swap may fully account for the fixed rate components of the original swaps 310 and the second remnant swap may account for the floating rate components of the original swaps. Otherwise, both the first remnant swap and the second remnant swap each account for a mixture of the fixed rate components and the floating rate components of the original portfolio.

As can be seen, the plurality of swaps 310 has been reduced to two line items, the first remnant swap, and the second remnant swap. Further, the gross notional amount associated with the plurality of swaps 310 has been reduced from the original gross notional to a reduced gross notional amount 370.

Table 380 is illustrative of a single swap solution for blending coupons associated with the plurality of swaps 310. In this example, the single swap may be created by matching the cash flows 345 of the blended portfolio with the cash flows of the original portfolio 336. The single blended swap may be created having a rate equal to the weighted average rate 323 associated with the original portfolio and the notional value of the single swap may correspond to the sum 326 of the notional values of the original portfolio. In some cases, the rate of the single swap may be within a range of values available in a financial market. In other cases, the rate of the single swap may be outside of the range of values available in the financial market.

Figure 4:
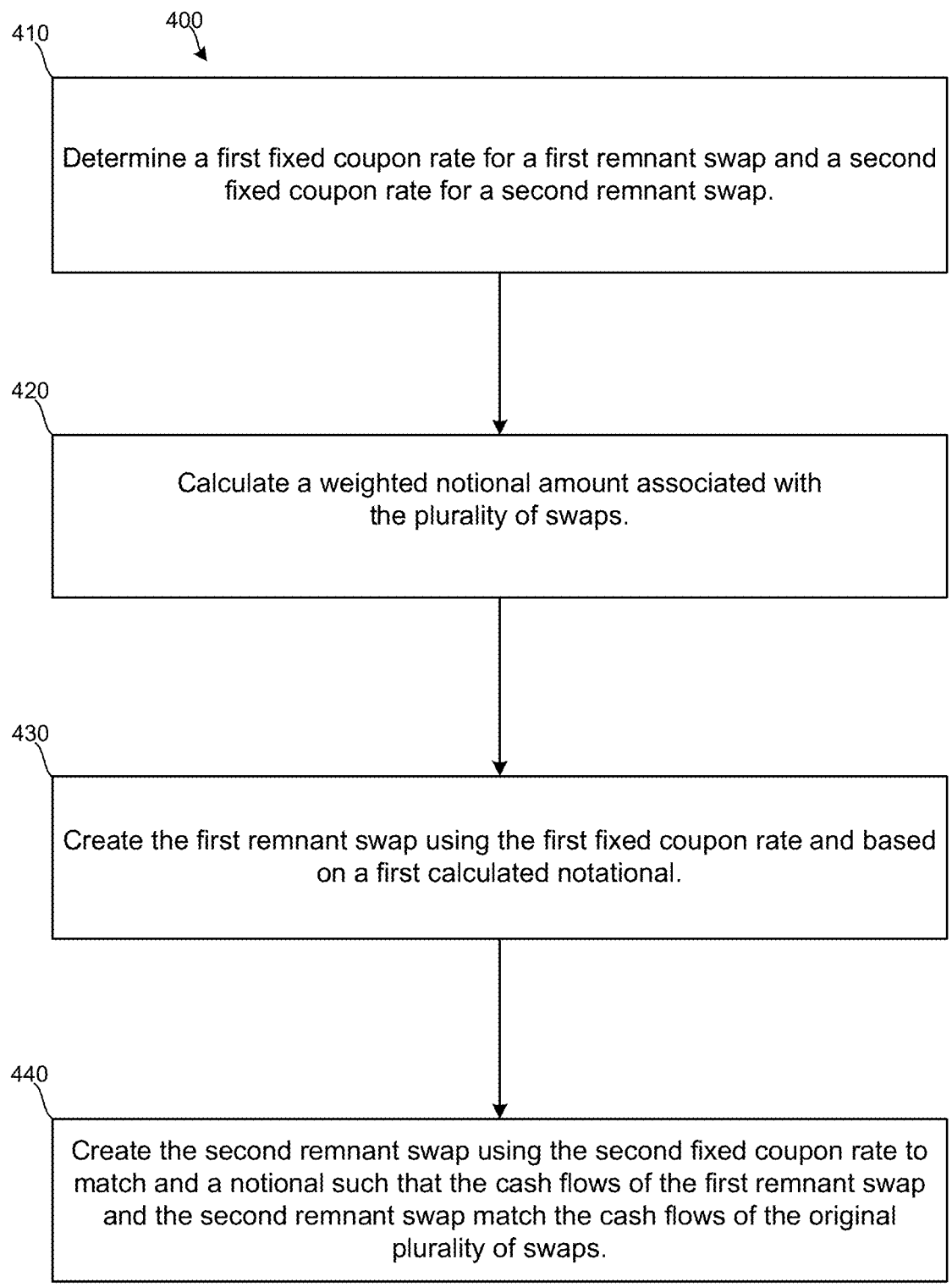
FIG. 4 shows an illustrative flow diagram for blending coupons associated with a plurality of swaps in accordance with an aspect the invention.

FIG. 4 shows an illustrative flow diagram 400 for blending coupons associated with a plurality of swaps in accordance with an aspect the invention. The flow diagram 400 of FIG. 4 may allow a computing device 244 to blend two or more different swaps. As discussed above, coupon blending is a form of compression that may be used to reduce notional amounts and/or line items for trades that are economically equivalent except for their fixed rates. In some cases, a goal for market participants may be to reduce capital requirements associated with a portfolio of swaps by reducing gross notional amounts and/or the number of line items associated with the swaps. Coupon blending may be accomplished for both pay swaps and receive swaps. One or more fixed rates used in blending the portfolio of swaps may be configured to lie within a range of rates associated with the different swaps included in the blended portfolio of swaps. Further, the compressed portfolio may be designed to reduce the number of line items associated with the swaps and/or reduce the gross notional corresponding to the portfolio of swaps, such as by compressing the plurality of swaps to a single swap or a pair of swaps.

In some cases, the precision of the one or more fixed rates used for compressing the portfolio of swaps may be chosen to within a precision range commonly used in the marketplace. For example, a fixed rate may have a precision of 5 decimal places, or fewer. In other cases, the precision may be set at a number acceptable to the financial institution associated with the portfolio of swaps. For example, a financial institution may desire a rate having a precision greater than 5 decimal places (e.g., 7 decimal places, 10 decimal places, etc.)

In some cases, the blended coupon and the associated blended trade may be represented by two netting options. In some cases, a number of swaps may automatically be blended. In some cases, a user may select one or more swaps to be included and/or one or more swaps to be excluded from inclusion in the blended trade. In some cases, when an account (e.g., a portfolio of swaps) is specified for blending, a standard netting option may be applied to the account before the calculating the coupon blending method of FIG. 4. For example, for swaps having a same interest rate, the notionals of these swaps may net out automatically.

At 410, a first fixed coupon rate 341 may be determined for a first remnant swap and a second fixed coupon rate 361 may be determined for a second remnant swap. The first fixed rate 341 may be greater than the second fixed rate 361. In some cases, a simple average rate 320 of rates associated with the plurality of swaps 310 may be calculated. This simple average rate 320 may be used as either the first fixed rate 341 or the second fixed rate 361. In some cases, the first fixed rate 341 and/or the second fixed rate 361 may be chosen to have a decimal precision acceptable in the marketplace. In some cases, the first fixed rate and/or the second fixed rate 361 may be rounded according to a specified decimal precision (e.g., up to 5 decimal places, etc.). In some cases, a rate associated with the plurality of swaps may be used as the first fixed rate 341 and/or the second fixed rate 361. For example, the first fixed rate may be set to the minimum fixed rate 350, the maximum rate 355 and the like. In some cases, the second fixed rate 361 may be set to the minimum fixed rate 350, the maximum rate 355 and the like, where the first fixed rate 341 may be greater than the second fixed rate 361. In an illustrative example, the first fixed rate 341 may be set to the maximum fixed rate 355 associated with the portfolio and the second fixed rate 361 may be set to a value less than the maximum fixed rate (e.g., the minimum fixed rate, 0, etc.). In another example, the first fixed rate 341 may be set to a value chosen by a user (e.g., a multiple of a rate associated with the portfolio, an available market rate, etc.) and the second rate 361 may be set to a value less than the first fixed rate, such as the minimum fixed rate 350 or another suitable value.

At 420, the weighted average rate 323 and the total weighted notional amount 327 may be calculated by the computing device 244. In some cases, the total weighted notional amount 327 may be used when determining the notional amounts associated with the first remnant swap (e.g., the calculated notional amount 342).

At 430, the computing device 244 may create the first calculated swap using the first fixed rate 341 and the newly calculated notional amount 342. In some cases, the computing device 244 may calculate a difference between the sum 326 of the portfolio notionals and the notional amount 342 of the first calculated swap. This difference may be used as a notional amount 362 of the second calculated swap.

At 440, the computing device may create the second calculated swap using the second fixed coupon rate 361 and the notional amount 362. The cash flows associated with the first remnant swap and the cash flows associated with the second remnant swap may fully account for the cash flows of the swaps in the original portfolio. When the second fixed rate is chosen to be 0, the cash flows associated with the first remnant swap 336 fully account for the cash flows 335 of the fixed leg of the original portfolio. As such, the second fixed rate 361 may be set to 0 or another value less than the first fixed rate 341. As can be seen, the line items of the plurality of swaps 310 of the portfolio may be compressed into two calculated swaps, where all other economic details of the calculated swaps will match the trades in the original portfolio.

The second fixed coupon rate may be different than the first fixed coupon rate. For example, the second rate may be less than the first rate. In an illustrative example, the first fixed rate may be determined to be the maximum fixed rate 355 associated with the swaps 310 to be compressed and the second fixed rate may be determined to be a rate less than the maximum fixed rate 355. In some cases, the second fixed rate may be set to zero, the minimum fixed rate 350 associated with the swaps, an average value of the fixed rates associated with the swaps, or another value less than the first fixed rate. When a rate available in the market is used, such as the maximum rate 355, the minimum rate 350, and the like, no need may exist for rounding the fixed rate value. In some cases, a rate may be selected for use as either the first fixed rate or the second fixed rate such as by using a mathematical equation (e.g., multiplying a rate associated with the portfolio by a multiplier, determining an average value, etc.), determining a desirable rate currently available in the market, or selecting a particular value. In other cases, the rate of the first remnant swap and/or the second remnant swap may be determined by determining a rate corresponding to a currently quoted swap having matching economics to the plurality of swaps and/or receiving a user entered rate.

In some cases, the computing device 244 may compute a weighted notional value 325 for each of the plurality of swaps 310 by multiplying the notional amount and the rate associated with the individual swaps. The computing device 244 may then determine the sum 327 of the weighted notional values 325. When the second fixed rate is non-zero, the computing device 244 may determine the notional value associated with the first remnant swap using equation (3), as discussed below. When the second fixed rate is desired to be 0, the computing device 244 may determine the notional value associated with the first remnant swap using the first fixed rate and the sum 327 of weighted notionals, such that a coupon payments of the first remnant swap may be equal to the sum of the fixed cash flows associated with the plurality of swaps.

In some cases, determining the second remnant swap may comprise determining a second swap having a notional value set to the difference between the sum of notional values of the plurality of swaps 310 and the notional value 342 of the first remnant swap. In some cases, the second remnant swap may be determined using the second fixed rate, where the second fixed rate is greater than or equal to zero and less than the first fixed rate of the first remnant swap.

The computing device 244 may be configured to obtain the plurality of swaps from a data repository of a financial institution, either automatically or in response to a compression request. In some cases, the plurality of swaps may be compressed to reduce a number of line items, reduce a gross notional amount associated with the plurality of swaps, or both. For example, thresholds may be established to define when a portfolio may be compressed, such as a line item threshold (e.g., a maximum number of swaps to be held in a portfolio before compression; the number of line items after compression is less than the number of line items before compression;, etc.) and/or a gross notional threshold (e.g. a maximum gross notional amount to be associated with the portfolio before compression; the gross notional amount after compression is smaller than the gross notional before compression, etc.). In an illustrative example, the computing device 244 may process instructions to determine when to compress a portfolio. For example, the computing device 244 may compare a count of the plurality of swaps included in a portfolio to a criterion, where the criterion may be that the number of line items after compression is smaller than the line items before compression. Responsive to the count meeting the criterion, the computer device 244 may blend at least a portion of the plurality of swaps using the first remnant swap and the second remnant swap, where the first remnant swap uses a first fixed rate and the second remnant swap uses a second fixed coupon rate less than the first fixed coupon rate. In some cases, the computing device 244 may compute a single compression swap, where the plurality of swaps is compressed into the single compression swap.

In some cases, the method 400 may include determining a total notional amount associated with a plurality of swaps having same economics, comparing the total notional amount to a criterion, and, responsive to the total notional amount meeting the criterion, blending at least a portion of the plurality of swaps 310 using the first remnant swap and the second remnant swap. In some cases, the criterion may correspond to a threshold associated with the gross notional of the plurality of swaps. For example, the computing device 244 may compare the gross notional amount to the criterion (e.g., a maximum gross notional amount; the gross notional amount after compression is smaller than the gross notional before compression, etc.). If the gross notional of the portfolio meets the criterion, then the computing device 244 may compress the portfolio. In some cases, in response to the criterion being met, the computing device 244 may send a notification that compression may be desirable. In some cases, two or more individual swaps included in the plurality of swaps may be selected by a user for compression.

In some cases, the computing device 244 may blend at least a portion of the plurality of swaps 310 using the first remnant swap and the second remnant swap on a daily basis and communicate, via the network 205, information about the first remnant swap and the second remnant swap to a financial institution associated with the plurality of swaps 310. The computing device 244 may further communicate, via the network 205, information about at least the blended portion of the plurality of the swaps to the financial institution, wherein at least the information about the first remnant swap and the second remnant swap may be used to meet a regulatory requirement, such as a BASEL 3 requirement. Definitions $N_i$: The notional of the ith swap in an original portfolio.
$r_i$: The coupon of the ith swap in the original portfolio.
$r^{Max}$: The max coupon of swaps in the original portfolio.
$N^{(a)}$: The notional of the first calculated swap for matching fixed cash flows associated with the original portfolio.
$N^{(b)}$: The notional of the second calculated swap for matching fixed cash flows associated with the original portfolio.
$R^{(a)}$: The coupon of the first calculated swap for matching fixed cash flows associated with the original portfolio.
$R^{(b)}$: The coupon of the second calculated swap for matching fixed cash flows associated with the original portfolio.
$R^L$: The lower boundary for the range of swap coupons.
$R^U$: The upper boundary for the range of swap coupons.

Cash Flow Matching Conditions

When compressing a plurality of swaps included in a portfolio, the cash flow associated with the one or more swaps calculated during the compression process should match the total cash flow of the original portfolio. For example, to ensure that the floating cash flows match, the sum of the notionals associated with the first calculated swap and the second calculated swap may be set equal to the sum of the notional values of the plurality of swaps to be compressed.

$$N^{(a)} + N^{(b)} = \Sigma N_i \triangleq A \quad (1)$$

Similarly, to ensure that the fixed cash flows match, the sum of the weighted notionals associated with the first calculated swap and the second calculated swap may be set equal to the sum of the weighted notional values of the plurality of swaps to be compressed.

$$N^{(a)} R^{(a)} + N^{(b)} R^{(b)} = \Sigma (N_i r_i) \triangleq B \quad (2)$$

Combining equations (1) and (2), we have $$N^{(a)} = \frac{B - A R^{(b)}}{R^{(a)} - R^{(b)}} \quad (3)$$

Because $N^{(a)} - (R^{(a)}$ and $N^{(b)}(R^{(b)})$ are symmetric, we let $R^{(a)} > R^{(b)}$ without loss of generality. Further, to prevent unreasonably large rates for the first and second calculated swaps, certain constraints are set, such as $R^L \leq R^{(a)}$, $R^{(b)} \leq R^U$. In some cases, $R^U$ may be set to a maximum coupon of the original portfolio ($r^{Max}$). In other cases, $R^U$ may be set to a different defined maximum value, a weighted average of coupons values, a user defined value, or the like. Similarly, $R^L$ may be set to zero, a defined fixed minimum coupon value, a weighted average coupon value, a user defined value, or the like. In an illustrative example, the rates for the calculated swaps may be defined as $R^{(a)} = r^{Max}$ and $R^{(b)} = 0$. In another illustrative example $R^{(a)}$ may be set to $R^U$ and $R^{(b)}$ may be set to a value less than $R^U$, such as $R^L$. In doing so, the first calculated swap and the second calculated swap may be determined using an objective function for minimizing the gross notional associated with the portfolio of swaps.

$$abs(N^{(a)}) + abs(N^{(b)}) = abs(N^{(a)}) + abs(A - N^{(a)}) \quad (4)$$

If A is positive, $$abs(N^{(a)}) + abs(A - N^{(a)}) = \begin{cases} N^{(a)} < 0 : A - 2N^{(a)} \\ 0 \leq N^{(a)} < A : A \\ N^{(a)} \geq A : 2N^{(a)} - A \end{cases} \quad (5)$$

Here, as the notional of the first swap, $N^{(a)}$, approaches the interval [0, A], the gross notional will be reduced.

Similarly, if A is negative, $$abs(N^{(a)}) + abs(A - N^{(a)}) = \begin{cases} N^{(a)} < A < 0 : A - 2N^{(a)} \\ A \leq N^{(a)} < 0 : -A \\ N^{(a)} \geq 0 : 2N^{(a)} - A \end{cases} \quad (6)$$

As before, as $N^{(a)}$ approaches the interval [A, 0], the gross notional will be reduced. Therefore, to minimize cash flows, it is desirable to minimize the absolute value of $N^{(a)}$, where $$N^{(a)} = \frac{B - A R^{(b)}}{R^{(a)} - R^{(b)}}.$$

This may be achieved by setting $R^{(a)}$ to be as large a value as desired, such as by setting $R^{(a)} = R^U$ (e.g., $r^{Max}$), and by setting $R^{(b)}$ to be as small a value as feasible, such as $R^{(b)} = R^L$ (e.g., 0). A detailed proof can be found below. However, other rates may be used as well. In other cases, $R^{(a)}$ may be set to a value other than $r^{Max}$, and $R^{(b)}$ may be a value greater than 0, but less than $R^{(a)}$. For example, $R^{(a)}$ may be set to a multiple of $r^{Max}$, or other value larger or smaller than $r^{Max}$, or some other user defined value. Similarly $R^{(b)}$ may be set to $r^{Min}$, or other value less than $R^{(a)}$.

Once the rates have been determined, the notional amounts N(a) and N(b) may be calculated, such as by using the equation:

$$N^{(a)} = \frac{B - A R^{(b)}}{R^{(a)} - R^{(b)}}, \text{ and } N^{(b)} = \sum N_i - N^{(a)}. \quad (7)$$

By defining the first calculated swap to have a notional N(a) and a fixed rate of R(a) and the second calculated swap to have a notional of N(b) and a fixed rate of R(b), the gross notional associated with these two swaps could be reduced from the gross notional amount associated with the original portfolio of swaps. Further, the fixed and the floating cash flows of the calculated swaps match the fixed and floating cash flows of the original portfolio.

Proof of $R^{(a)}=R^U$ and $R^{(b)}=R^L$

Recall that $$N^{(a)} = \frac{B-AR^{(b)}}{R^{(a)}-R^{(b)}} = \frac{B-AR^{(a)}}{R^{(a)}-R^{(b)}} + A$$

and that $R^{(a)}>R^{(b)}$, which also means that $R^{(a)}-R^{(b)}>0$. Further, the constraints are defined as: $R^L \le R^{(a)}$, $R^{(b)} \le R^U$. Because we want to minimize the absolute value of $N^{(a)}$, $|N^{(a)}|$, $R^{(a)}$ is desired to be as large as possible, or in other words, $R^{(a)}=R^U$.

To show why $R^{(b)}=R^L$ is desirable, consider a case when $B>0$ and $A>0$. In this case, when $B-AR^U>0$, this indicates that for any $R \in [R^L]$, $B-AR>0$. As such, in this case where $N^{(a)}>0$, and $N^{(a)}$ is to be minimized by minimizing $R^{(b)}$, such as by setting $R^{(b)}=R^L$. For example, when $R^{(b)}$ decreases, $R^{(a)}-R^{(b)}$ increases. This, in turn, causes $$N^{(a)} = \frac{B-AR^{(a)}}{R^{(a)}-R^{(b)}} + A$$

to decrease.

When $B-AR^U<0$, we desire to minimize $|N^{(a)}|$. When $R^{(a)}=R^U$, and $$N^{(a)} = \frac{B-AR^{(a)}}{R^{(a)}-R^{(b)}} + A < A.$$

Figure 5A:
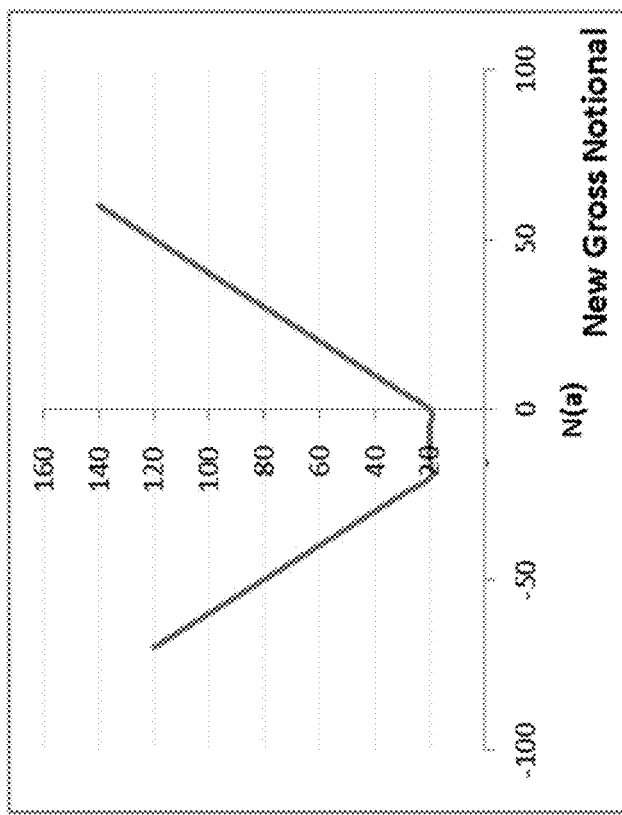
FIGS. 5A-5B show illustrative charts showing a comparison of a new gross notional amount for the blended portfolio compared to the notional amount of a blended swap.

The value of $N^{(a)}$ is desired to be maximized or, in other words, to be a value close to A. Therefore, we want $R^{(b)}=R^L$. For example, when $R^{(b)}$ decreases, $R^{(a)}-R^{(b)}$ increases and $$N^{(a)} = \frac{B-AR^{(a)}}{R^{(a)}-R^{(b)}} + A$$

increases. Note that in this case, as shown in FIG. 5A, when $A>0$, any $N^{(a)}$ that falls within interval [0, A] will minimize the objective function. Here, we choose $R^{(b)}=R^L$ such that $N^{(a)}$ is as large and as close to A as possible, which will minimize the objective function.

When $B>0$, $A<0$, for any $R \in [R^L]$, $R^U$, $B-AR>0$, and thus $N^{(a)}>0$. As such, we want to minimize $N^{(a)}$. Similar to discussion above, we reach conclusion that $R^{(a)}=R^U$ and $R^{(b)}=R^L$.

When $B<0$, $A>0$, this means that for any $R \in [R^L]$, $R^U$, $B-AR<0$, thus $N^{(a)}<0$, and we want maximize $N^{(a)}$. Similar to discussion above, we reach conclusion that $R^{(a)}=R^U$ and $R^{(b)}=R^L$.

When $B<0$, $A<0$, the following cases exists. When $B-AR^U<0$, this indicates that for any $R \in [R^L, R^U]$, $B-AR<0$. In this case, $N^{(a)}<0$, and we want maximize $N^{(a)}$. Similar to discussion above, we reach the conclusion that $R^{(a)}=R^U$ and $R^{(b)}=R^L$.

When $B-AR^U>0$, we want to minimize $|N^{(a)}|$. When $R^{(a)}=R^U$, $$N^{(a)} = \frac{B-AR^{(a)}}{R^{(a)}-R^{(b)}} + A > A.$$

Figure 5B:
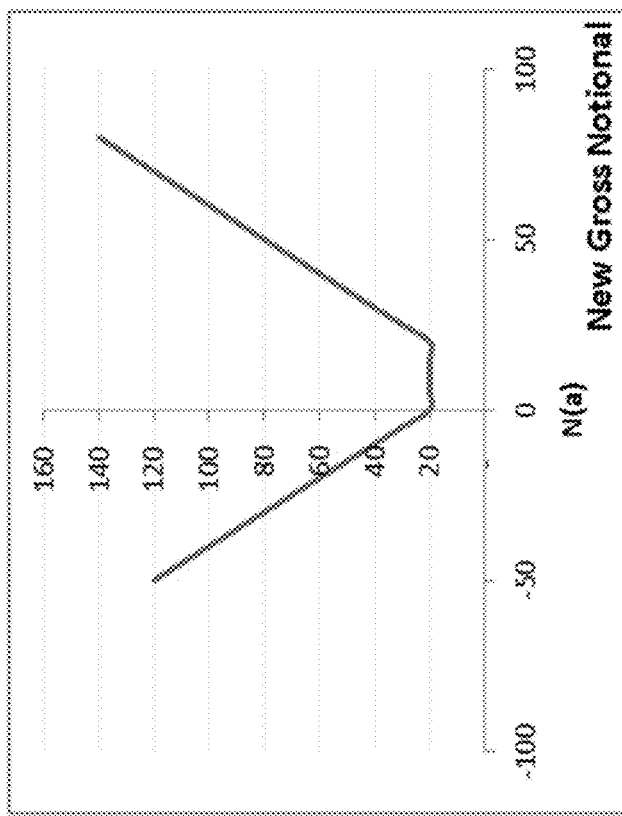

Therefore, we want to minimize $N^{(a)}$ to be close to A. This is achieved by setting $R^{(b)}=R^L$. For example, when $R^{(b)}$ decreases, $R^{(a)}-R^{(b)}$ increases, and $$N^{(a)} = \frac{B-AR^{(a)}}{R^{(a)}-R^{(b)}} + A$$

decreases. In this case, as shown in FIG. 5B when $A<0$, any $N^{(a)}$ that falls within interval [A, 0] will minimize the objective function. In some cases, we may choose $R^{(b)}=R^L$ such that $N^{(a)}$ is as small and as close to A as possible. In doing so, the objective function is minimized.

Figure 6A:
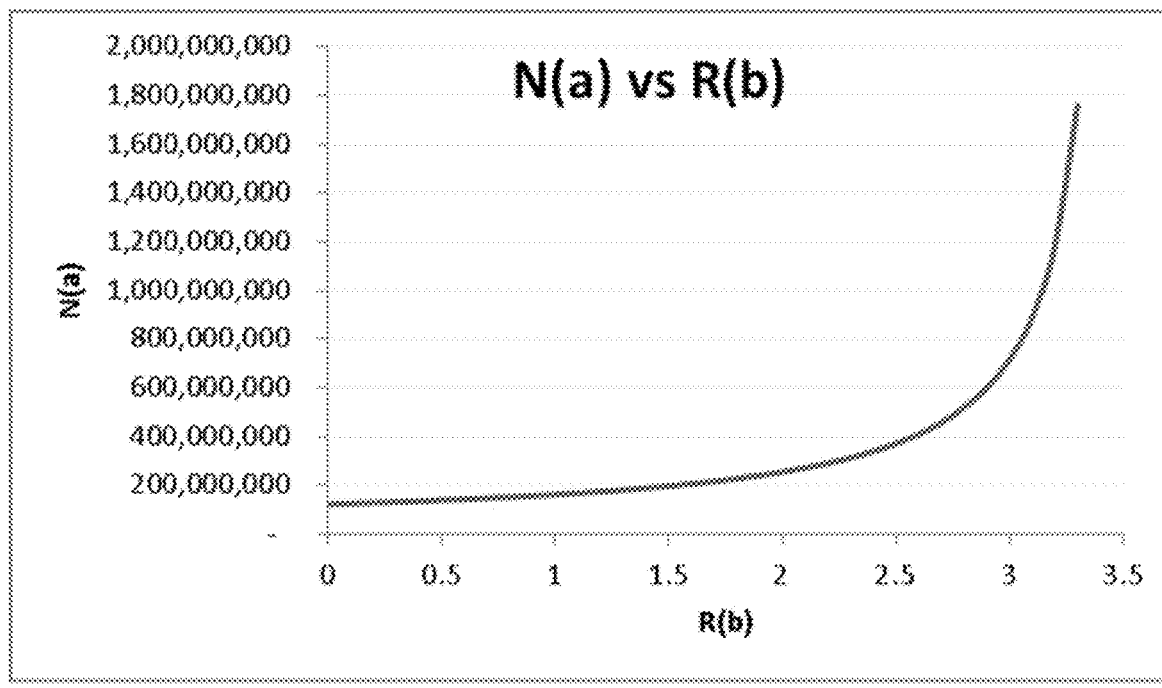
FIG. 6A shows an illustrative chart comparing a notional amount of a first blended swap to a rate associated with the second blended swap.
Figure 6B:
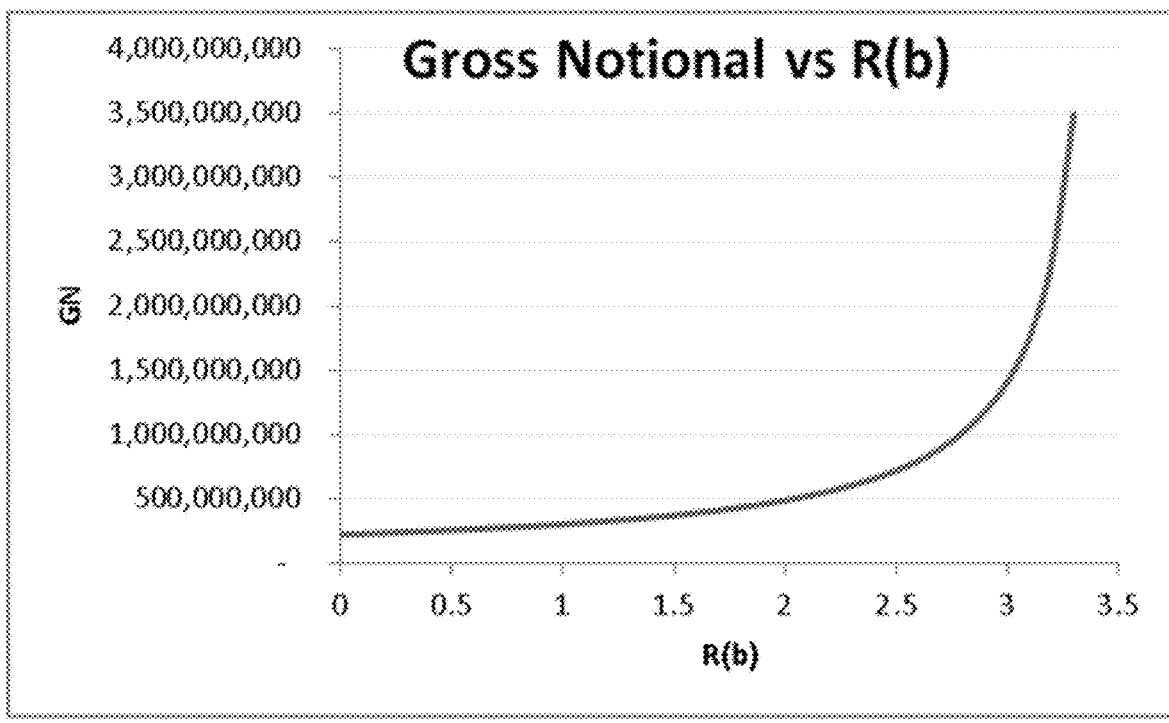
FIG. 6B shows an illustrative chart comparing a gross amount of a blended portfolio to a rate associated with the second blended swap.

FIG. 6A illustrates that over a range of $R^{(b)}$ near 0, the notional of the first trade $N^{(a)}$ remains near a minimum value. Similarly, FIG. 6B illustrates that over a range of rates $R^{(b)}$ near zero, the gross notional of the compressed swaps remain near a minimum value. As such, by choosing a value of $R^{(b)}$ different than 0, the gross notional of the compressed swaps may still remain within a range close to a minimum value. In some cases, a portfolio owner may desire to compress a portfolio of multiple swaps into a single swap to represent the original portfolio. This may be accomplished in a number of ways. In a first illustrative example, the notional and coupon for the single blended swap may be defined as N* and R*, respectively. To ensure that the fixed cash flow and the floating cash flow match the corresponding cash flows of the original portfolio, the notional, N*, and coupon, R*, may be determined using:

$$N^* = \Sigma N_i = A \tag{8}$$

and, $$R^* = \frac{\Sigma(N_i r_i)}{N^*} = \frac{B}{A} \tag{9}$$

To match the cash flow of the compressed swap to the cash flow of the original portfolio, the precision of the rate R* may be determined in such a way that the cash flows match. In some cases, the rate R* may be rounded to a precision similar to a precision available in a financial market (e.g., up to 5 decimal places, up to 7 decimal places, etc.). In some cases, the precision of the rate R* may necessarily be greater than is available in a market, to ensure that the cash flows match. For example, when matching the cash flows, a greater precision may be required (e.g., at least 7 decimal places). Rounding of the rate may or may not be required and may be specified by an institution associated with the original portfolio.

Because the notional value of each swap included in the original portfolio may be positive or negative. As such, some caveats may exist for this approach when both payer and receiver swaps are included in the original portfolio to be compressed. For example, when the net notional of the original portfolio is zero (e.g., A=0), the calculation cannot be performed. In another case, when the net notional of the original portfolio is close to zero, the coupon value of the compressed swap may become large. In some cases, this large coupon value may not be desirable.

In some cases, instead of using $$R^* = \frac{\Sigma(N_i r_i)}{N^*} = \frac{B}{A},$$

the rate of the blended swap may be set to some coupon number R close to R*. In such cases, additional frequent payments may be added to account the cash flow difference due to the difference between R and R*. In this case, the swap notional would still be net notional, i.e. $N^*=\Sigma N_i=A$. This scheme may result in a more complex cash flow management scheme.

Using a two swaps approach, we have $R^{(a)}=R^U$ and $R^{(b)}=R^L$. If $R^L$ is set to be 0, the second swap will become a swap with zero coupon. In such cases, these two swaps may be combined into a single swap having different notional on the fixed leg and the floating leg. In other words, the fixed leg notional may be $N^{fix}=N^{(a)}$, and the floating leg notional may be $N^{fl}=N^{(a)}+N^{(b)}$. While this combined swap may avoid any shortcomings of the previously discussed swaps, this swap may be considered a non-standard swap. In some cases, a portfolio owner may approve a non-standard swap, such as this on a case by case basis.

In some cases, to blend the coupons associated with the swaps of a particular portfolio, a single blended swap may be constructed having the same financials as the sum of the swaps in the portfolio. For example, a swap may be constructed having a notional equal to the sum of the notionals of the swaps. In this case, the rate of the single blended swap may be found by dividing the sum of the weighted notionals by the sum of the notionals of the swaps to be compressed.

Figure 7:
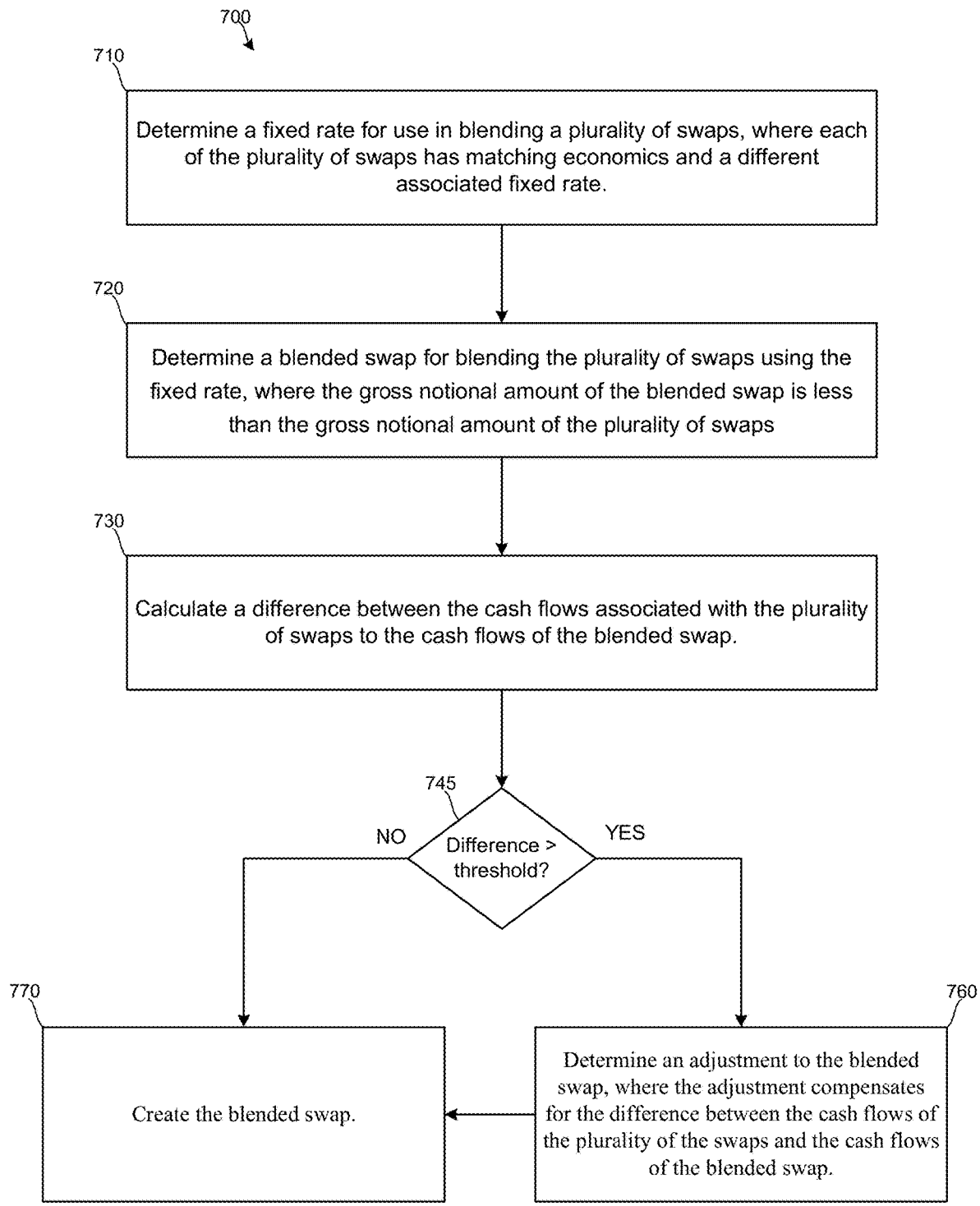
FIG. 7 shows an illustrative flow diagram for blending coupons associated with a plurality of swaps in accordance with an aspect the invention.

FIG. 7 shows an illustrative flow diagram 700 for blending coupons associated with a plurality of swaps in accordance with an aspect the invention. For example, at step 710, a computing device (e.g., the computing device 244, the clearinghouse module 140, etc.) may determine a fixed rate for use in blending a plurality of swaps (e.g., the swaps 310), where each of the plurality of swaps 310 has matching economics and a different associated fixed rate. In some cases, the swaps include both pay swaps and receive swaps. At step 720, the computing device 244 may determine a blended swap for blending the plurality of swaps 310 using the fixed rate. At 730, the computing device may determine a difference between the cash flows of the plurality of swaps and cash flows associated with the blended swap. For example, in some cases, a selected precision (e.g., 2 decimal places, 5 decimal places, up to 7 decimal places, etc.) of the fixed rate may not allow the cash flows to be completely matched. The cash flow difference is then compared to a threshold at 745. In some cases, the threshold may be a value associated with an acceptable difference in cash flows and the single blended swap may be created at 770. For example, the threshold may be a value less than a specified amount (e.g., about 100 dollars, about 1 dollar, about 1 cent, etc.). If the difference is more than the threshold, then at 760, an adjustment may be made to the blended swap that is created at 720. However, if the difference is less than a threshold, no compensation may be performed.

In some cases, a compensation amount (e.g., a cash amount) may be associated with the blended swap, where the compensation amount corresponds to the difference between the cash flows of the original portfolio and the cash flow of the blended swap. In another example, the precision of the fixed rate may be extended (e.g., increased from 5 decimal places to 6 or more decimal places) until the difference has been reduced below the threshold. In another cases, compensation may include adding a precise spread over the single swap trade. In some cases, different notional amounts may be applied to each leg of the single swap such that the difference is reduced below the threshold. In another example, a two swap solution may be substituted for the single swap solution.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims.

We claim:

1. A computer-implemented method comprising:
    accessing, via a network, a portfolio of swaps automatically by a clearinghouse computing system, wherein the portfolio comprises a plurality of line items stored in a non-transitory memory of a financial institution computing system, each associated with one of swap of the portfolio of swaps and storing data indicative thereof including a fixed rate associated therewith where the associated fixed rate of one of the plurality of line items may be different from the associated fixed rate of another of the plurality of line items;
    monitoring, periodically by the clearinghouse computing system, the plurality of line items to identify opportunities to reduce the total number of the plurality of line items stored in the portfolio, the monitoring further comprising:
        determining, automatically by the clearinghouse computing system, at least a first fixed rate for use in blending a subset of the plurality of line items based on the fixed rate associated with each of the swaps indicated by the line items of the subset, wherein each of the swaps indicated by the line items of the subset has similar financial terms and a different associated fixed rate and the first fixed rate is one of the associated fixed rates of the line items of the subset, wherein the swaps indicated by the line items of the subset are collectively characterized by one or more economic characteristics;
        determining, by the clearinghouse computing system, a first remnant swap using the first fixed rate and computing the economics thereof;
        determining, by the clearinghouse computing system when the economics of the first remnant swap are not equal to the economics of the subset, a second remnant swap using a second fixed rate, wherein the second fixed rate may be different than the first fixed rate; and
        compressing, by the clearinghouse computing system, the subset of line items into the first remnant swap and, if determined, the second remnant swap, wherein the total number of the plurality of line items stored in the memory of the financial institution computing system is reduced to a first line item associated with the first remnant swap and, if determined, a second line item associated with the second remnant swap, wherein the first remnant swap and, if determined, the second remnant swap, are characterized by one or more economic characteristics identical to the one or more economic characteristics collectively characterizing swaps indicated by the subset of the plurality of line items of the portfolio of swaps.

2. The computer-implemented method of claim 1, wherein the subset comprises the plurality of line items.

3. The computer-implemented method of claim 1, wherein determining at least the first rate comprises:
    determining a maximum of rates associated with the line items of the subset.

4. The computer-implemented method of claim 1, comprising:
prior to determining the first fixed rate, determining another subset of the plurality of line items all having the same associated fixed rate and netting each line item of the other subset together wherein any unnetted remainder is formed into a third remnant swap for which a new line item comprising data indicative thereof is stored in the memory in place of the line items of the other subset.

5. The computer-implemented method of claim 1, wherein determining at least the first rate comprises:
determining the first fixed rate and the second fixed rate so that a gross notional amount may be minimized.

6. The computer-implemented method of claim 1, wherein determining at least the first fixed rate comprises:
determining at least one of the first fixed rate and, if determined, the second fixed rate based on a current market rate for a quoted swap having matching economics to the swaps indicated by the line items of the subset.

7. The computer-implemented method of claim 1, wherein determining at least the first fixed rate comprises receiving a user-entered rate value for at least one of the first fixed rate and, if determined, the second fixed rate.

8. The computer-implemented method of claim 1, further comprising:
determining a weighted notional value associated with each of the swaps indicated by the line items of the subset, wherein the weighted notional value for a particular swap is determined based on the fixed rate associated with the particular swap and a notional value associated with the particular swap.

9. The computer-implemented method of claim 8, further comprising:
determining a notional value associated with the first remnant swap using the first fixed rate and a sum of weighted notional values that are associated with each of the plurality of swaps.

10. The computer-implemented method of claim 1, wherein determining the second remnant swap comprises:
determining a trade having the second fixed rate and a notional value equal to a difference between a sum of notional values of the swaps indicated by the line items of the subset and a notional value of the first remnant swap.

11. The computer-implemented method of claim 1, wherein determining the second remnant swap comprises:
determining a notional value associated with the second remnant swap based on a notional amount associated with the swaps indicated by the line items of the subset and a notional amount associated with the first remnant swap.

12. The computer-implemented method of claim 1, comprising:
obtaining the subset from a data repository of a financial institution;
comparing a count of the number of line items to a criterion; and
blending, responsive to the count meeting the criterion, at least a portion of the subset using the first remnant swap and the second remnant swap.

13. The computer-implemented method of claim 1, comprising:
determining a total notional amount associated with the subset;
comparing the total notional amount to a criterion; and
blending, responsive to the total notional amount meeting the criterion, at least a portion of the subset using the first remnant swap and the second remnant swap.

14. The computer-implemented method of claim 1, wherein the monitoring is performed daily.

15. The computer-implemented method of claim 14, comprising:
communicating, via the network, information corresponding to at least a blended portion of the subset to the financial institution, wherein at least the information corresponding to the first remnant swap and the second remnant swap are to be used to meet a regulatory requirement.

16. A system comprising:
a financial institution computing system comprising a memory storing a portfolio of swaps, the portfolio of swaps comprising a plurality of line items, each associated with one of swap of the portfolio of swaps and storing data indicative thereof including a fixed rate associated therewith where the associated fixed rate of one of the plurality of line items may be different from the associated fixed rate of another of the plurality of line items;
a network; and
a clearinghouse computing system communicatively coupled to the network, the clearinghouse computing system comprising:
a processor; and
one or more non-transitory memory devices, the one or more non-transitory memory devices storing instructions, that when executed by the processor, cause the clearing house computing system to:
monitor, periodically, the plurality of line items to identify opportunities to reduce the total number of the plurality of line items stored in the portfolio, the monitoring further comprising:
determine, automatically, at least a first fixed rate for use in blending a subset of the plurality of line items based on the fixed rate associated with each of the swaps indicated by the line items of the subset, wherein each of the swaps indicated by the line items of the subset has similar financial terms and a different associated fixed rate and the first fixed rate is one of the associated fixed rates of the line items of the subset, wherein the swaps indicated by the line items of the subset are collectively characterized by one or more economic characteristics;
determine a first remnant swap using the first fixed rate and computing the economics thereof;
determine, when the economics of the first remnant swap are not equal to the economics of the subset, a second remnant swap using a second fixed rate, wherein the second fixed rate may be different than the first fixed rate;
communicate, via the network, information corresponding to the first remnant swap and, if determined, the second remnant swap to an institution associated with the plurality of swaps, and
replace the subset of line items stored in the memory of the financial institution computing device with a first line item corresponding to the first remnant swap and, if determined, a second line item corresponding to the second remnant swap, wherein the first remnant swap and, if determined, the second remnant swap, are characterized by one or more economic characteristics identical to the one or more economic characteristics collectively characterizing swaps indicated by the subset of the plurality of line items of the portfolio of swaps.

17. The system of claim 16, wherein the one or more non-transitory memory devices store instructions that, when executed by a processor, cause the clearing house computer system to:

compare at least one metric associated with the subset to a specified criterion, wherein the metric comprises a total number of swaps having same economics or a total notional amount associated with the plurality of swaps having same economics; and responsive to the total notional amount meeting the criterion, blend at least a portion of the subset using the first remnant swap and the second remnant swap, the subset including line items indicative of one or more payer swaps and one or more receiver swaps.

18. The system of claim 16 wherein the one or more non-transitory memory devices store instructions that, when executed by a processor, cause the clearing house computer system to:

reduce a number of line items of the subset to a first line item associated with the first remnant swap and a second line item associated with the second remnant swap.

19. The system of claim 16 wherein the subset comprises the plurality of line items.

20. The system of claim 16 wherein the one or more non-transitory memory devices store instructions that, when executed by a processor, cause the clearing house computer system to, prior to the determination of the first fixed rate, determine another subset of the plurality of line items all having the same associated fixed rate and net each line item of the other subset together wherein any unnetted remainder is formed into a third remnant swap for which a new line item comprising data indicative thereof is stored in the memory in place of the line items of the other subset.

21. A system comprising:

means for accessing, via a network, a portfolio of swaps by a clearinghouse computing system, wherein the portfolio comprises a plurality of line items stored in a memory of a financial institution computing system, each associated with one of swap of the portfolio of swaps and storing data indicative thereof including a fixed rate associated therewith where the associated fixed rate of one of the plurality of line items may be different from the associated fixed rate of another of the plurality of line items;

means for monitoring, periodically, the plurality of line items to identify opportunities to reduce the total number of the plurality of line items stored in the portfolio, the monitoring further comprising:

means for determining, automatically, at least a first fixed rate for use in blending a subset of the plurality of line items based on the fixed rate associated with each of the swaps indicated by the line items of the subset, wherein each of the swaps indicated by the line items of the subset has similar financial terms and a different associated fixed rate and the first fixed rate is one of the associated fixed rates of the line items of the subset, wherein the swaps indicated by the line items of the subset are collectively characterized by one or more economic characteristics;

means for determining a first remnant swap using the first fixed rate and computing the economics thereof;

means for determining, when the economics of the first remnant swap are not equal to the economics of the subset, a second remnant swap using a second fixed rate, wherein the second fixed rate may be different than the first fixed rate; and means for compressing the subset of line items into the first remnant swap and, if determined, the second remnant swap, wherein the total number of the plurality of line items stored in the memory of the financial institution computing system is reduced to a first line item associated with the first remnant swap and, if determined, a second line item associated with the second remnant swap, wherein the first remnant swap and, if determined, the second remnant swap, are characterized by one or more economic characteristics identical to the one or more economic characteristics characterizing the subset of the plurality of line items of the portfolio of swaps.

22. The system of claim 21, comprising:

means for, prior to determining the first fixed rate, determining another subset of the plurality of line items all having the same associated fixed rate and netting each line item of the other subset together wherein any unnetted remainder is formed into a third remnant swap for which a new line item comprising data indicative thereof is stored in the memory in place of the line items of the other subset.

* * * * *